United States Patent [19]
Kawakubo et al.

[11] Patent Number: 6,065,771
[45] Date of Patent: May 23, 2000

[54] INSTRUMENT PANEL FOR AIR BAG

[75] Inventors: Yasushi Kawakubo; Takeshi Yamaji; Kazuhiko Yoshioka; Shiro Ozaki, all of Osaka; Masahiko Yanagihara, Aichi, all of Japan

[73] Assignee: Toyo Tire & Rubber Co., Ltd., Osaka, Japan

[21] Appl. No.: 09/171,300

[22] PCT Filed: Dec. 25, 1997

[86] PCT No.: PCT/JP97/04840

§ 371 Date: Nov. 12, 1998

§ 102(e) Date: Nov. 12, 1998

[87] PCT Pub. No.: WO98/36948

PCT Pub. Date: Aug. 27, 1998

[30] Foreign Application Priority Data

Feb. 19, 1997 [JP] Japan .................................. 9-034831
May 30, 1997 [JP] Japan .................................. 9-142312

[51] Int. Cl.[7] .................................................. B60R 21/20
[52] U.S. Cl. ........................................................ 280/728.3
[58] Field of Search ............................ 280/728.1, 728.3, 280/728 B, 732

[56] References Cited

U.S. PATENT DOCUMENTS

| | | | |
|---|---|---|---|
| 4,148,503 | 4/1979 | Shiratori et al. ........................ | 280/731 |
| 5,072,967 | 12/1991 | Batchelder et al. ..................... | 280/732 |
| 5,074,583 | 12/1991 | Fujita et al. ............................. | 280/735 |
| 5,082,310 | 1/1992 | Bauer ....................................... | 280/732 |
| 5,096,220 | 3/1992 | Nakajima ................................ | 280/728 |
| 5,154,444 | 10/1992 | Nelson .................................... | 280/732 |
| 5,375,876 | 12/1994 | Bauer et al. ........................ | 280/728 B |
| 5,487,558 | 1/1996 | Ball et al. .............................. | 280/728.3 |
| 5,615,910 | 4/1997 | Margetak et al. ....................... | 280/731 |
| 5,626,357 | 5/1997 | Leonard ............................... | 280/728.3 |
| 5,698,283 | 12/1997 | Yamasaki et al. ........................ | 428/43 |
| 5,779,262 | 6/1998 | Totani et al. ......................... | 280/728.3 |
| 5,865,461 | 2/1999 | Totani et al. ......................... | 280/728.3 |
| 5,868,419 | 2/1999 | Taguchi et al. ....................... | 280/728.3 |

FOREIGN PATENT DOCUMENTS

| | | |
|---|---|---|
| 1-83652 | 6/1989 | Japan . |
| 2-241856 | 9/1990 | Japan . |
| 3-281457 | 12/1991 | Japan . |
| 4-135946 | 5/1992 | Japan . |
| 4-197849 | 7/1992 | Japan . |
| 3-023297 | 1/1996 | Japan . |

*Primary Examiner*—J. J. Swann
*Assistant Examiner*—Christopher Bottorff
*Attorney, Agent, or Firm*—Jordan and Hamburg LLP

[57] ABSTRACT

In order to reconcile the cleaving performance and the quality of appearance of an instrument panel for an bag, an instrument panel is provided having a skin member of a single layer structure, a cleaving section formed by a groove provided on the back of the skin member is composed of a longitudinal cleaving section which is substantially linear and a pair of "V" shaped lateral cleaving sections which are ramified respectively from both ends of the longitudinal cleaving section and which open forward and extend obliquely with respect to the direction of extension of the longitudinal cleaving section. Furthermore, where a skin member of a double-layered structure in which at least a cushion layer is disposed on the back of a skin layer, a door member is formed on the back of a skin member, in which a brittle section is created, as one body there with by injection-molding a resin material and a brittle section of the door member facing the brittle section of the skin member.

15 Claims, 11 Drawing Sheets

INSTRUMENT PANEL FOR AIR BAG

BACKGROUND OF THE INVENTION

The present invention relates to an instrument panel for an air bag, which stores an air bag for a passenger seat in particular among vehicle air bags, in a folded state at the inside thereof and which cleaves so as to deploy the air bag in front of a passenger as the air bag inflates in emergency.

An air bag system for constraining a passenger by being inflated when a vehicle collides is disposed at the inside of an instrument panel in many recent vehicles.

While a cleaving section for deloying the air bag within the car room is provided in the instrument panel of this type, the quality of appearance of the instrument panel is liable to degrade in general when the cleaving performance is to be enhanced. This is because the cleaving section is created by embrittling the part of the instrument panel corresponding to an air bag deployment section. Therefore, it is required to reconcile and have both the cleaving performance and the quality of appearance of the instrument panel for an air bag.

Some of such instrument panels have a cushion layer made of foam resin. Such instrument panels include (1) one in which a skin member, a door member and the cushion layer are formed in a body by injecting and foaming the foam material between the skin member and the door member having a single-layer structure, (2) and another one in which a skin member having a double-layer structure formed by molding a skin layer and the cushion layer in a body in advance is formed in a body with the door member by injection-molding synthetic resin, thus forming the door member on the back of the skin member. The difference of those structures originates mainly from the difference of the foam resins forming the cushion layer, i.e. polyurethane foam resin is used usually for the former and polyolefine foam resin is used usually for the latter.

In the panel using the skin member having the single-layer structure, the cleaving section, for example, is created by providing a groove by means of a high-frequency welder or the like on the back of the skin member at the part corresponding to the air bag deployment section.

While a relatively hard type of the vinyl chloride resins has been used for such a skin member having the single-layer structure, and thus the above-mentioned cleavage was relatively readily achieved in the past, some of the skin members are made of soft PVC (poly-vinyl chloride) or TPO (styrene or olefinic thermoplastic elastomer) recently, thus causing a problem that the cleaving section cleaves less readily as compared to the past ones because such material has extensibility and flexibility more than the above-mentioned material.

Further, although the cleavage may be achieved more readily by thinning the thickness of the cleaving section, there has been a problem that the moldability of the thin part and the durability of the product drop due to the characteristics of the PVC and TPO, thus damaging the quality of appearance thereof.

Figure 14:
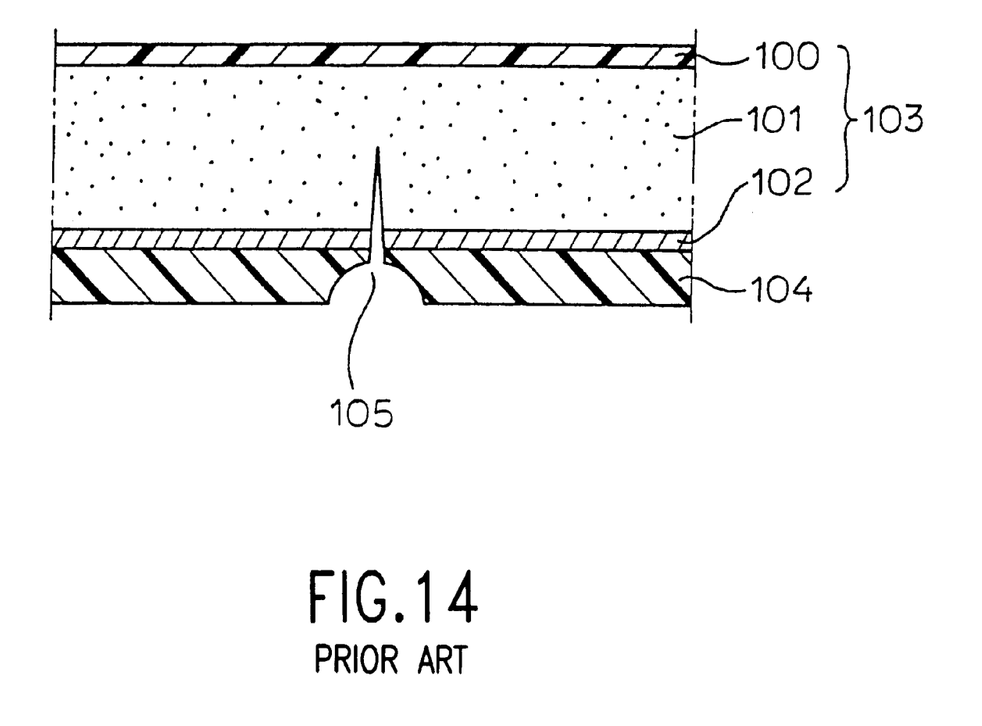
FIG. 14 is a longitudinal section view of a main part of a prior art instrument panel for an air bag.

Meanwhile, in the panel using the skin member having the above-mentioned double-layer structure, as shown for example in FIG. 14, a cleaving section 105 is created by molding a door member 104 made of thermoplastic resin by means of injection molding on the back of and in a body with a skin member 103 formed by disposing a cushion layer 101 made of foam resin and a barrier layer 102 made of soft resin on the back of a skin layer 100 and by cutting the part of the door member 104 and the skin member 103 corresponding to the air bag development section into the shape as shown in the figure by means of ultrasonic or a high-frequency laser.

Because the cleaving section 105 is created after the molding, i.e. after producing the instrument panel, the door member 104 is disconnected in creating the cleaving section 105. Therefore, there has been a problem that because the rigidity of the part corresponding to the cleaving section 105 is low during normal use, the skin layer 100 is dented or wrinkled locally, thus damaging the quality of appearance as stress is concentrated on the thin part of the skin member 103 where the rigidity is low when force is applied by touching the instrument panel for example.

Further, it requires a cumbersome post-processing of creating the cleaving section 105 after the production of the instrument panel. It still further requires highly advanced technology keeping the depth of the cut for creating the cleaving section 105 constant and in controlling the thickness of the panel at the part corresponding to the cleaving section 105. These have caused an increase in production cost.

DISCLOSURE OF INVENTION

Accordingly, it is an object of the present invention to solve the above-mentioned problems by reconciling cleaving performance during inflating an air bag and quality of appearance thereof during normal use of an instrument panel with a skin member having a single or double-layer structure as described above.

An instrument panel for an air bag of the present invention is characterized in that a cleaving section, which cleaves as an air bag inflates, is formed by a groove that is created on the back of a skin member, the cleaving section is composed of a longitudinal cleaving section which is substantially linear and a pair of V-shaped lateral cleaving sections ramified and connected respectively both ends in the longitudinal direction of the longitudinal cleaving section and opening forward and extending obliquely with respect to the direction of extension of the longitudinal cleaving section.

In the embodiment described above, because the V-shaped lateral cleaving sections opening forward and extending obliquely with respect to the direction of extension of the longitudinal cleaving section which is substantially linear, are ramified and connected respectively to both ends in the longitudinal direction of the longitudinal cleaving section, the cleavage of the longitudinal cleaving section which has proceeded along with the inflation of the air bag is ramified smoothly from the ends thereof in the longitudinal direction and shifts to the lateral cleaving sections. Accordingly, the cleaving performance during deploying the air bag may be improved considerably without particularly thinning the thickness of the cleaving sections. Therefore, it is possible to obtain the predetermined cleaving performance while keeping the thickness of the cleaving section to a degree permitting the quality of appearance to be maintained. This kind of arrangement is effective, in particular in an instrument panel with a skin member having the single-layer structure.

In the arrangement described above, a thin portion may be formed by creating the groove with a certain width at each ramified portion of the cleaving section and the thin portion may be formed into a substantially triangular shape that is inversely tapered toward the center of the ramified portion from each of the lateral and longitudinal cleaving sections.

In this case, the triangular thin portion provides a certain clearance or play, so that it is possible to reduce resistance 40 the cleavage ramifying to the lateral cleaving section and changing the direction thereof and to ramify the direction of the cleavage, which otherwise should advance straight, smoothly from the longitudinal cleaving section to the lateral cleaving sections. Thereby, the cleaving performance may be improved further.

Further, an initial cleaving section may be created substantially at the center in the longitudinal direction of the longitudinal cleaving section by creating the groove with a certain widened width.

It smoothes the initial cleavage of the cleaving section when the air bag inflates and allows the cleaving performance to be improved further.

Still further, the skin member, a door member and a cushion layer may be formed as one body by injecting and foaming a foam material between the skin member, and the door member which is disposed so as to face to the skin member and is pushed open as the air bag inflates, and projections, which break through the cleaving section of the skin member as the air bag inflates, may be provided so as to project from the side of the door member facing toward the cleaving section to the side of the skin member.

In this case, the door member is pushed open at first as the air bag inflates and the projections, created on the door member, break through the cleaving sections of the skin member. Therefore, even if the skin member is made of a material such as PVC or TPO, which excel in extensibility and flexibility, the skin may be cleaved adequately and readily along the cleaving sections while keeping the thickness of the cleaving sections created on the skin member to a degree not degrading the moldability and the durability of the product, i.e., to a degree of maintaining the quality appearance of the instrument panel. Thus, the cleaving performance thereof may be improved considerably.

Furthermore, alone the length of the projections, projection portions at the part facing to the initial cleaving section, or at the parts facing both of the initial cleaving section and the triangular thin portions may be formed higher than projection portions at the part facing other parts of the cleaving section.

In this case, the higher projection portions break through the initial cleaving section and the triangular thin portions first and the cleaving performance along the whole cleaving sections thereafter is enhanced further.

An instrument panel for an air bag of the present invention comprises a skin member, which has at least a cushion layer made of foam resin disposed on the back of a skin layer, and in which a brittle section, which does not reach the skin layer, is created at the part corresponding to an air bag deployment section; and a door member, made of synthetic resin, in which a brittle section is created at the part corresponding to the air bag deployment section by thinning the door member; and where the skin member is formed as one body with the door member so that the respective brittle sections face to each other by injection-molding the synthetic resin on the back of the skin member.

According to the arrangement described above, the door member having the brittle section is created by injection-molding the synthetic resin on the back of the skin member having a brittle section so as to consolidate the skin member and the door member so that those brittle sections face toward each other. The cleaving section which cleaves as the air bag inflates is created by both brittle sections. Because the cleaving section is not created by cutting the skin member and the door member after consolidating them, the brittle section of the door member is not disconnected. That is, the brittle section of the door member is thinned and the whole door member is continuous even though the brittle section exists, so that the rigidity of the part which turns out to be the cleaving section when deploying the air bag is enhanced. Therefore, it is possible to suppress stress from concentrating on the brittle section of the skin member by force applied to the instrument panel during normal use prevent, the skin layer from being dented or wrinkled locally and the quality of appearance from dropping. Accordingly, it is possible to concentrate stress on both the brittle section of the door member and the brittle section of the skin member facing thereto and to fully enable the predetermined cleaving performance and the air bag deployment performance when the air bag inflates. Further, unlike in the prior art described above, because the cleaving section is not created by cutting the door member by means of ultrasonic or high-frequency after molding the skin member as one body with the door member, no post-processing which would be cumbersome and require a highly advanced technique in controlling thickness is necessary, so that the production cost of the whole instrument panel may be reduced.

In the arrangement described above, it is desirable to form the brittle section of the skin member by a linear or slit cut line having a depth not reaching the skin layer, enhancing the rigidity of the part of the brittle section of the skin member corresponding to the cleaving section further and maintaining the quality of appearance during normal use.

When the linear or slit cut line is created obliquely with respect to the direction of thickness of the instrument panel, it is possible to prevent resin from infiltrating the inside of the cut line created on the skin member and the function of the brittle section itself from being damaged during inject-molding by setting the inclination of the cut line in direction in which the injected resin will not flow into the cut line.

An instrument panel for an air bag comprises a skin member having at least a cushion layer made of foam resin and disposed on the back of a skin layer and a door member made of synthetic resin in which a brittle section is created at the part corresponding to an air bag deployment section by thinning the door The skin member is formed as one body with the door member by injection-molding the synthetic resin on the back of the skin member so the one body has a uniform thickness over the whole range. The thickness of a portion of the door member at The brittle section is thinner than the thickness of the remaining portion and the thickness of a portion of the skin member facing toward the portion of the door member adjacent to the brittle section is thicker than that of the remaining portion.

According to the arrangement described above, the cleaving performance and the air bag deployment performance may be enhanced by causing stress to concentrate on the brittle section of the door member when the air bag inflates due to the difference between the thickness of a portion of the door member at the brittle section and that of the other portion because the thickness of a portion of the door member at to the brittle section is set to be thinner than that of the other portion while forming the whole area of the instrument panel generally in a uniform thickness. Further, the rigidity of the part which works as the cleaving section when the air bag is deployed may be increased and the quality of appearance may be prevented from dropping because the brittle section of the door member is just thinned and the whole door member is continuous. Still more, because the cleaving section is not created by cutting the door member, after consolidating the skin member and the door member, by means of ultrasonic or high-frequency, a no cumbersome post-processing which would require highly a advanced technique in controlling the thickness is necessary and the production cost of the whole instrument panel may be reduced.

DESCRIPTION OF PREFERRED EMBODIMENTS

Preferred embodiments of the present invention will be explained below with reference to the appended drawings.

Figure 1:
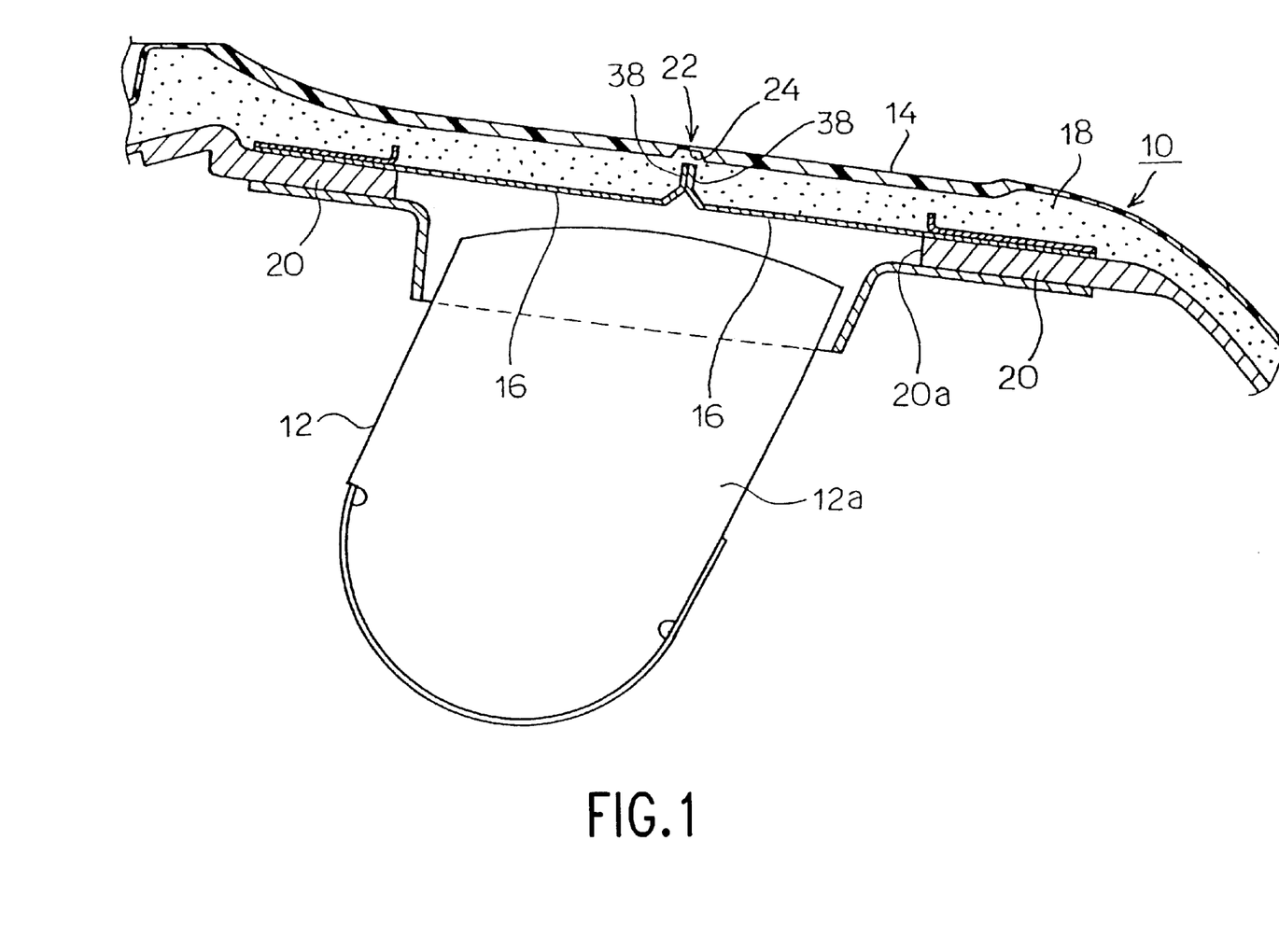
FIG. 1 is a longitudinal section view of an instrument panel for an air bag according to a first embodiment of the present invention.

FIG. 1 is a section view of an instrument panel for an air bag according to a first embodiment of the present invention, wherein the instrument panel 10 contains an air bag system 12 for a passenger seat thereunder and serves as a cover for an upper opening of an air bag case 12a.

The instrument panel 10 of the first embodiment is structured by forming a skin member 14 having a single-layer structure, a door member 16 and a cushion layer 18 formed as one body by injecting and foaming a polyurethane resin material between the skin member 14 and the door member 16. That is, the instrument panel 10 is structured by disposing core members 20, having an opening 20a corresponding to an opening of the air bag case 12a, and a pair of door members 16, of a double-leaf door whose ends are fixed to the core members 20 respectively and which are made of a resin plate or a metal plate so as to face each other, on the back of the skin member 14, made of PVC or TPO, and by molding the cushion layer 18, made of semi-hard polyurethane foam, by injecting the polyurethane resin material between the skin member 14 and the core member 20 as well as the door member 16.

Figure 2:
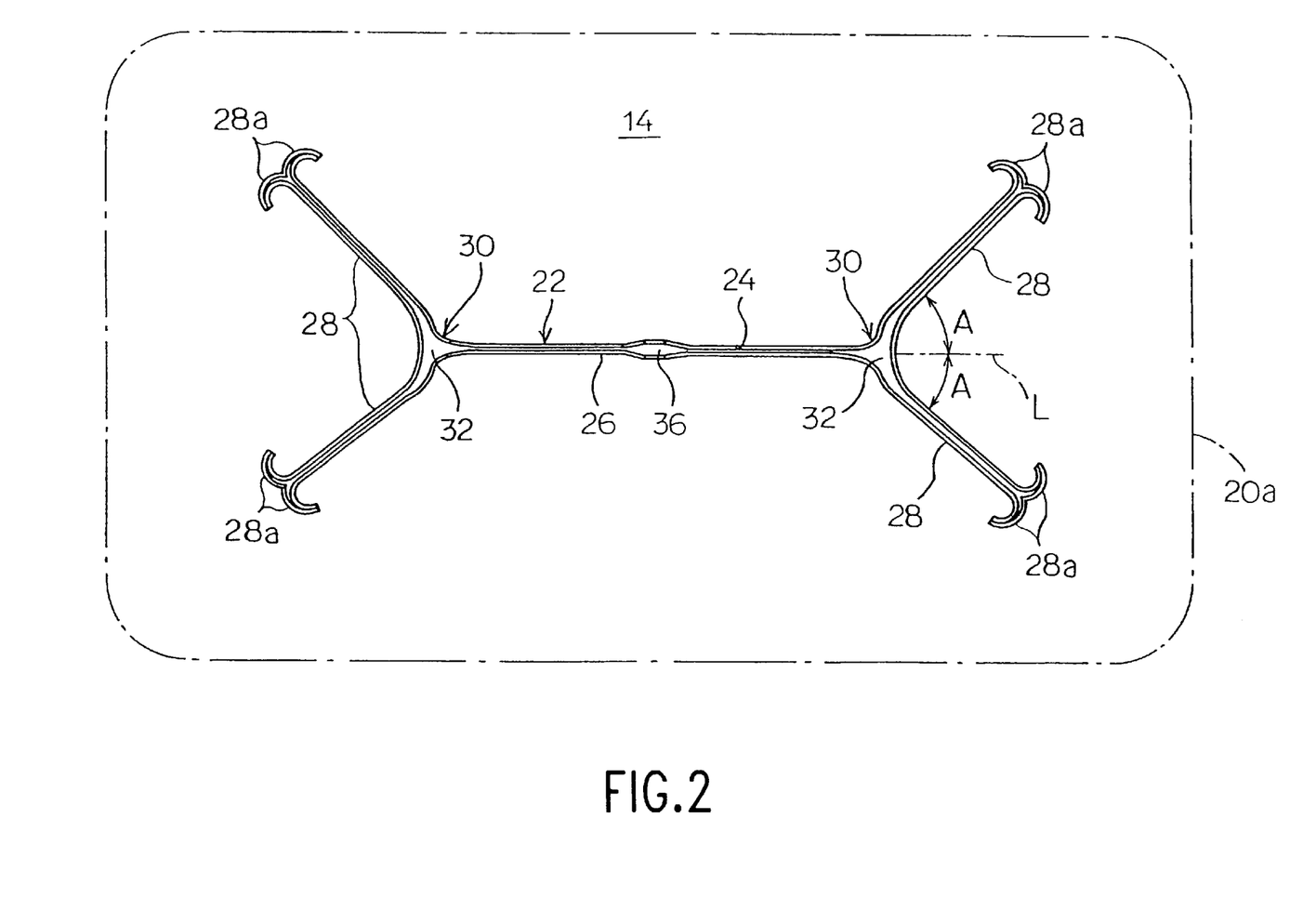
FIG. 2 is a plan view showing a cleaving section of a skin member of the instrument panel.
Figure 3:
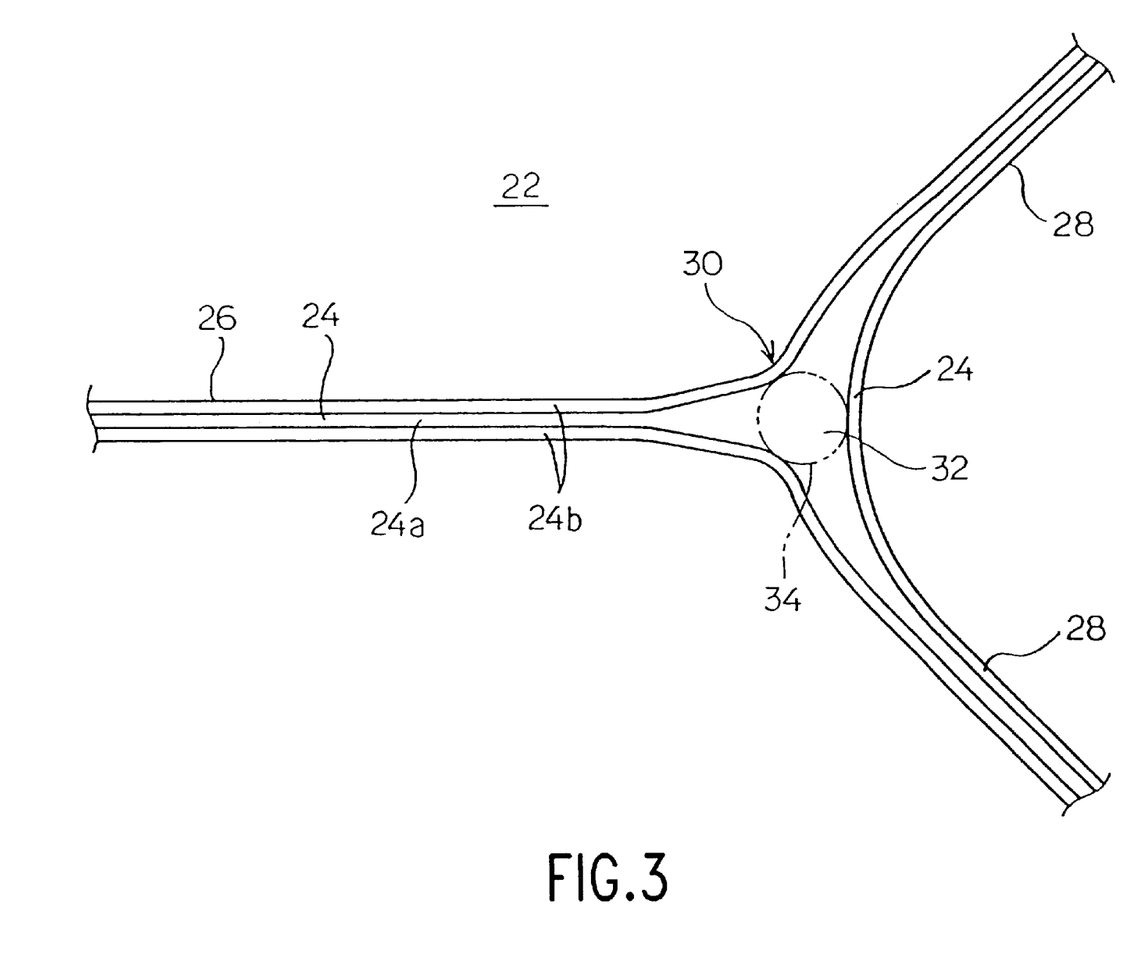
FIG. 3 is an enlarged view of a ramified portion of the cleaving section.
Figure 4:
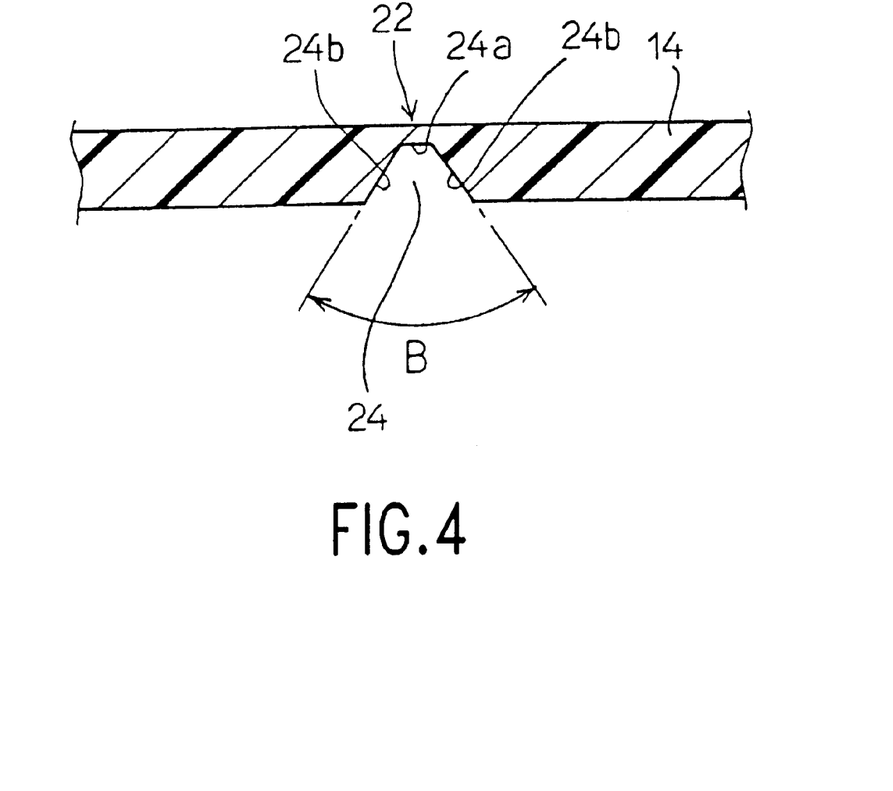
FIG. 4 is an enlarged section view of a groove of the skin member.

Referring to FIGS. 2–4, in the instrument panel 10, a cleaving section 22 that cleaves as the air bag inflates is formed by a groove 24 provided on the back of the skin member 14. The cleaving section 22 is formed as a double-Y shape when seen in plan as shown in FIG. 2. That is, the cleaving section 22 is composed of a longitudinal cleaving section 26, which is formed substantially linearly, and a pair of V-shaped lateral cleaving sections 28 ramified from both ends in the longitudinal direction of the longitudinal cleaving section 26 and opening and extending to, right and left with respect to an imaginary extension line L of the longitudinal cleaving section 26 at an angle A in a range of about 30°, to 60°, or preferably 45°.

The groove 24 is widened 40 a certain width at each ramified portion of the above-mentioned cleaving sections 26 and 28 to create thin portions 32 form as bottom walls 24a thereof. The thin portion 32 is formed into a substantially triangular shape inversely tapered off from each of the longitudinal and lateral cleaving sections 26 and 28 to the center of the ramified portion 30.

Each end 28a of the lateral cleaving section 28 is created so as to be ramified again forming semicircular arcs as shown in FIG. 2 to stop the advancement of cleavage at this portion. It is noted that the semicircular end 28a may be omitted.

Preferably, the breadth of the triangular thin portion 32 is such that the diameter of a circle 34 inscribing the thin portion 32 is about 10 to 15 mm as shown in FIG. 3. It is noted that the reference numeral 24b in the figure denotes side walls of the groove 24.

As shown in FIG. 2, there is created an initial cleaving section 36 where the groove 24, whose bottom wall 24a normally has a width of 1 mm, is widened to about 3 to 5 mm at the center part of the longitudinal cleaving section 26.

The ends of the door members 16 of the double-leaf door facing toward each other abut each other under the longitudinal cleaving section 26 as shown in FIG. 1. Projections 38 are provided upwardly at a region facing to the initial cleaving section 36 so as to cleave the initial cleaving section 36 at first by the projections 38 when the air bag inflates.

It is noted that an open edge angle B of the groove 24 forming the cleaving section 22 is preferred to be in a range of 90° to 60° as shown in FIG. 4 in order to improve the moldability and the initial cleavability.

In the instrument panel 10 of the present embodiment, the door member 16 is pushed open at first when the air bag inflates and thereby, the projections 38 of the door member 16 break through the initial cleaving section 36.

While the whole longitudinal cleaving section 26 cleaves and the cleavage shifts to the lateral cleaving sections 28, the cleavage of the longitudinal cleaving section 26 is smoothly ramified and is transmitted to the lateral cleaving sections 28 because the lateral cleaving sections 28 are formed into the shape of a V and diverge at the predetermined angle A with respect to the direction of extension of the longitudinal cleaving section 26.

Further, because the substantially triangular thin portion 32 having a certain width is created at the ramified portion 30, it is possible to reduce resistance 40 the cleavage ramifying from the longitudinal cleaving section 26 to the lateral cleaving sections 28 by changing the direction thereof and to ramify the direction of cleavage, which should otherwise advance straight, from the longitudinal cleaving section 26 to the lateral cleaving sections 28 smoothly.

It is also possible to smoothly conduct the initial cleavage of the whole cleaving section by creating the initial cleaving section 36 at the center of the longitudinal cleaving section 26 and by cleaving it by the projections 38 of the door member 16 and to improve the moldability and the initial cleavability of the cleaving sections 26 and 28 by reducing the open edge angle B of the groove 24.

Figure 5:
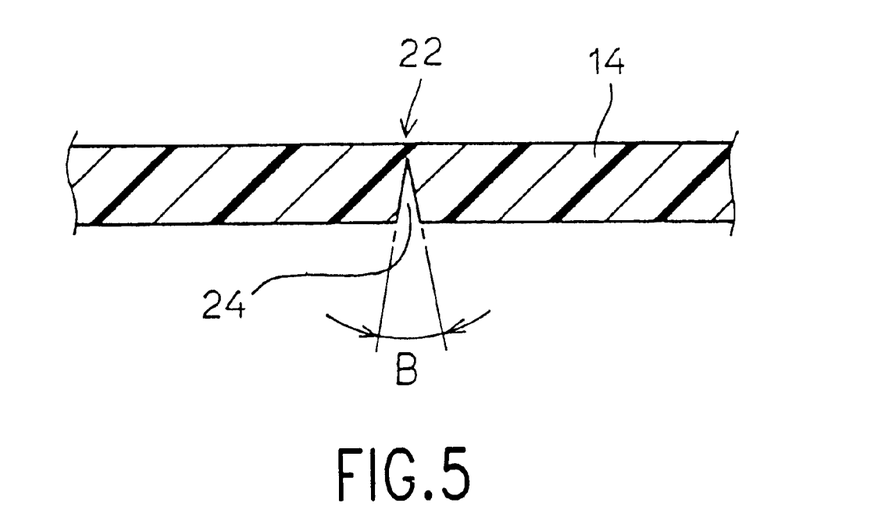
FIG. 5 is an enlarged section view showing another example of the groove.

FIG. 5 shows a modified example concerning the shape of the groove 24. The groove 24 has an inverse narrow V shape in this case. By thus reducing the open edge angle B of the groove 24, it is possible to maintain an advantageous quality of appearance without causing any local dents or uneveness on the gloss of the surface of the skin member 14 and at the same time it is possible to improve the cleavability of the panel during inflating the air bag by combining this feature with the longitudinal cleaving section 26 and the substantially Y-letter shaped lateral cleaving sections 28 ramified from and connected at both ends of the longitudinal cleaving section 26.

Figure 6:
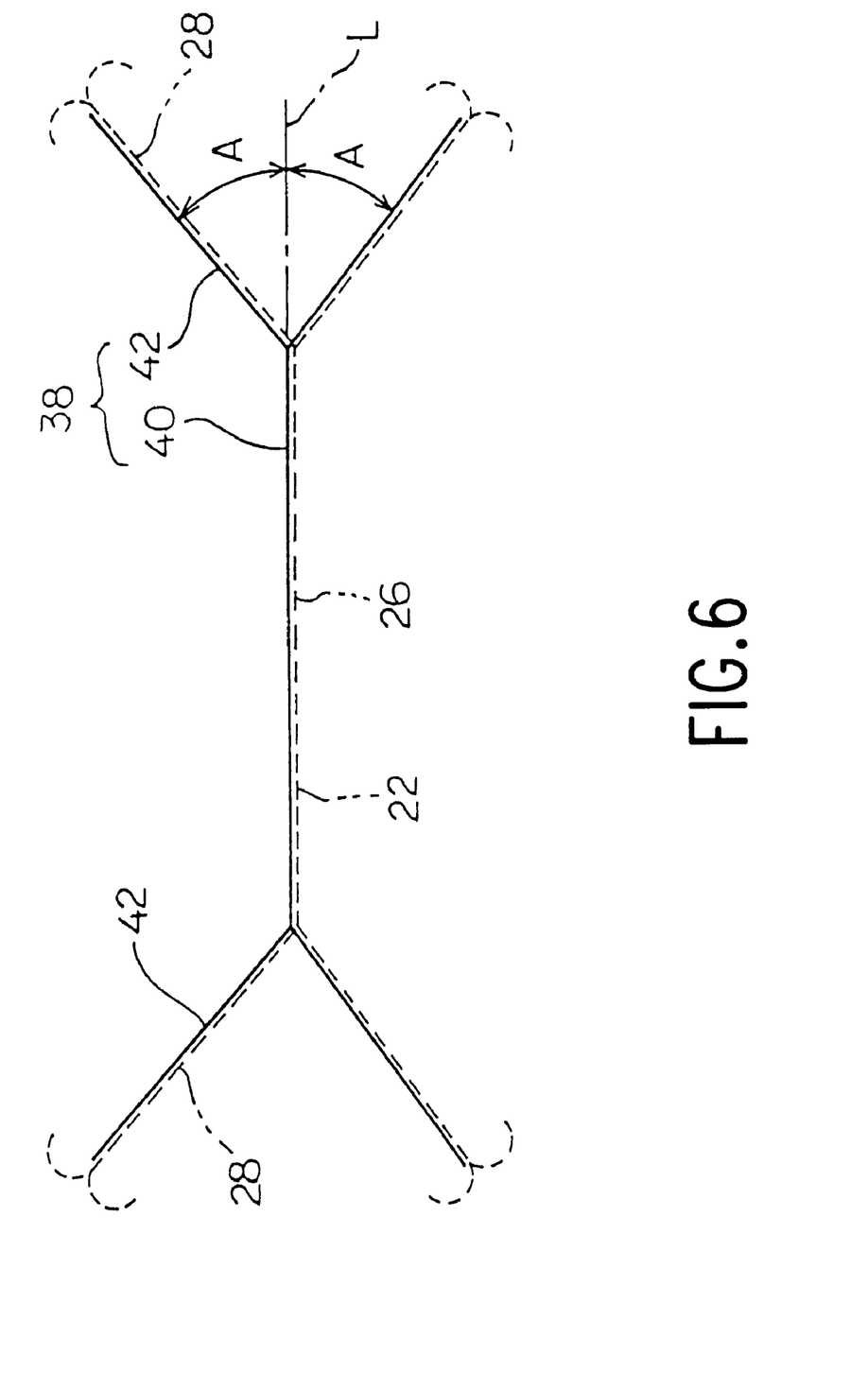
FIG. 6 is a plan view showing another example of a projection of a door member in the first embodiment.

FIG. 6 shows a modified example concerning the projection 38 which is provided so as to project from the door member 16 to the skin member 14. In this case, the projections 38 are provided so as to project toward the skin member 14 at the region of the door member 16 facing toward the whole range of the longitudinal cleaving section 26 and the lateral cleaving sections 28. That is, the projections 38 which face toward the whole cleaving section 22 are formed by a substantially linear longitudinal projection 40 which faces toward the longitudinal cleaving section 26 and a pair of lateral projections 42, ramified from both ends in the longitudinal direction of the longitudinal projection 40 and opening and extending in the shape of "V" to the to right and left at an angle A in a range of about 30° to 60° with respect to the extension line L of the longitudinal projection 40.

When the projections 38, which face the whole range of the cleaving section 22, are provided by the substantially linear longitudinal projection 40 and the pair of V-shaped lateral projections 42 linked with both ends of the longitudinal projection as described above, the cleavage advances as the longitudinal projection 40 and the lateral projections 42 created on the door member 16 break through the brittle part of the skin member 14 forming the longitudinal cleaving section 26 and the lateral cleaving sections 28, respectively, when the door member 16 is pushed open by the inflation of the air bag. Accordingly, it is possible to suppress and minimize small pieces of urethane from flying due to the deviation of the locus of cleavage and to the rupture of the cushion layer 18 by fully effecting the adequate cleavability along the cleaving section 22 while relatively increasing the thickness of the cleaving section 22 created on the skin member 14 to a degree not degrading the moldability thereof and the durability of the product when the skin member 14 is made of a material excellent in extendibility and flexibility such as PVC and TPO.

Figure 7:
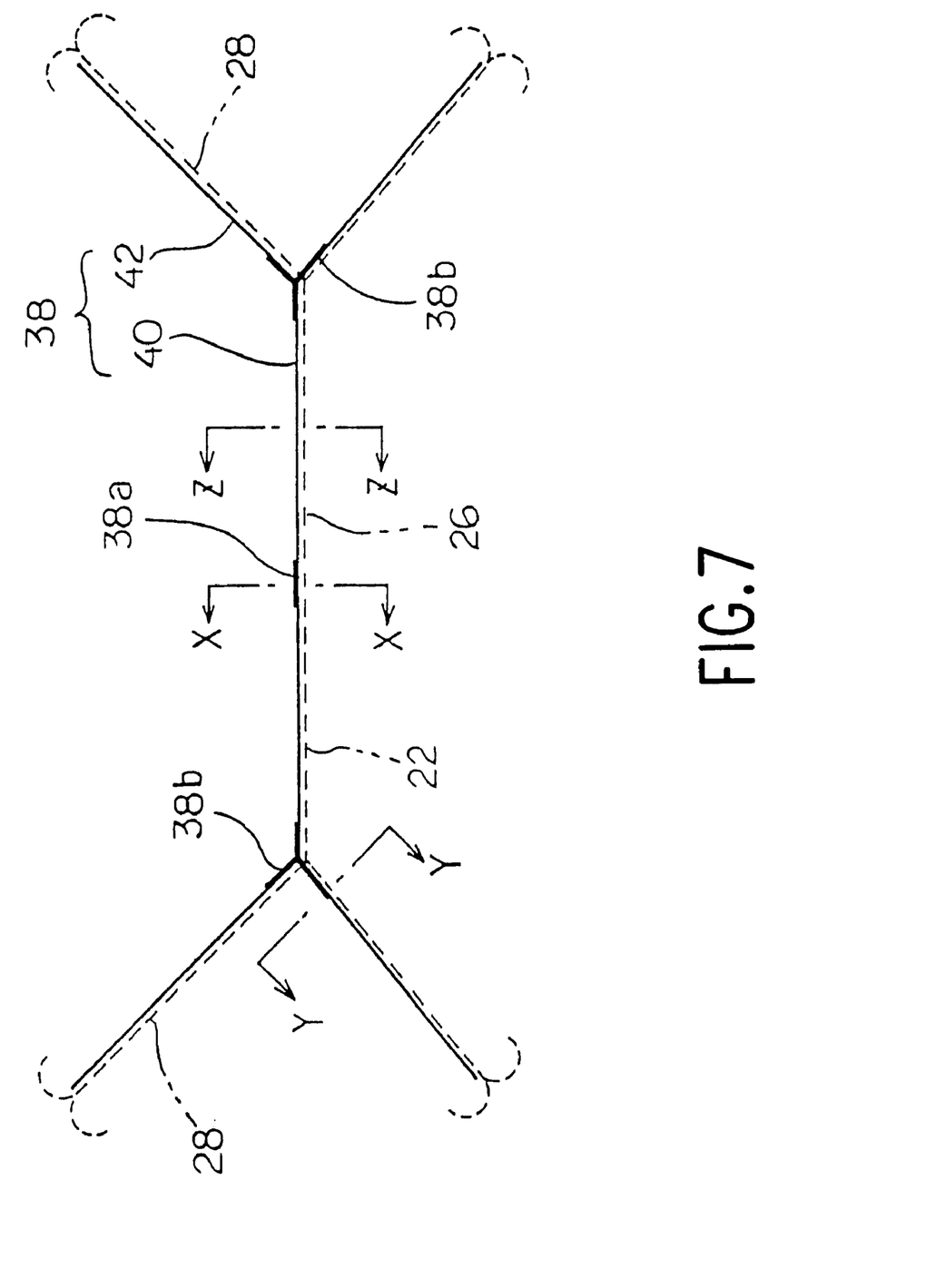
FIG. 7 is a plan view showing a still another example of a projection of the door member in the first embodiment.
Figure 8:
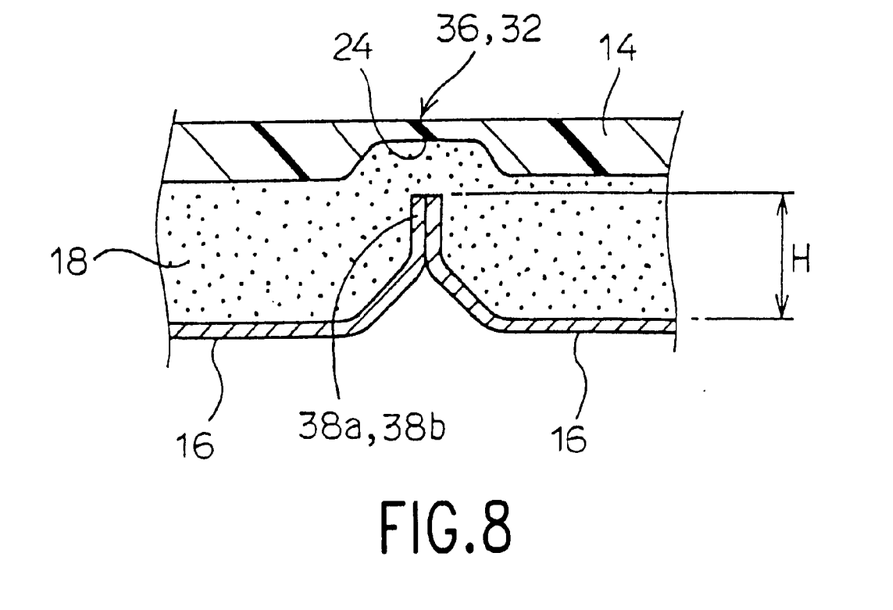
FIG. 8 is an enlarged section view of a main part along lines X—X and Y—Y in FIG. 7.
Figure 9:
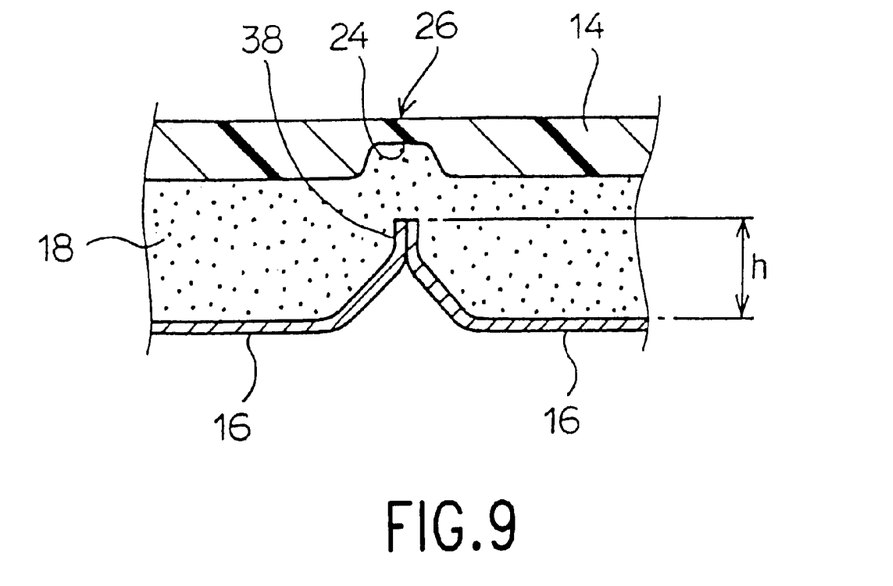
FIG. 9 is an enlarged view of a main part along a line Z—Z in FIG. 7.

FIG. 7 shows a still further example concerning the projections 38 provided so as to project from the door member 16 toward the skin member 14. In the arrangement in which the projections 38 are provided over the whole range of the cleaving section 22 as shown in the example in FIG. 6, the shape of the projection 38 is modified as described below. That is, a height H, which is a length of the projection from the upper face of the door member 16, as shown in FIG. 8, of a projection 38a at the part facing to the initial cleaving section 36 and of a projection 38b at the part facing to the substantially triangular thin portion 32 is increased more than a height h (shown in FIG. 9) of the projection 38 facing other parts of the cleaving section 22 as shown in FIG. 7. Of the entire length of the projections 38 created on the door member 16 which are pushed open due to the inflation of the air bag, the projections 38a and 38b whose height is higher break through the initial cleaving section 36 and the substantially triangular thin portion 32 first and the cleavage further along the whole cleaving section 22 which then takes place thereafter is enhanced, by adopting such an arrangement.

Figure 10:
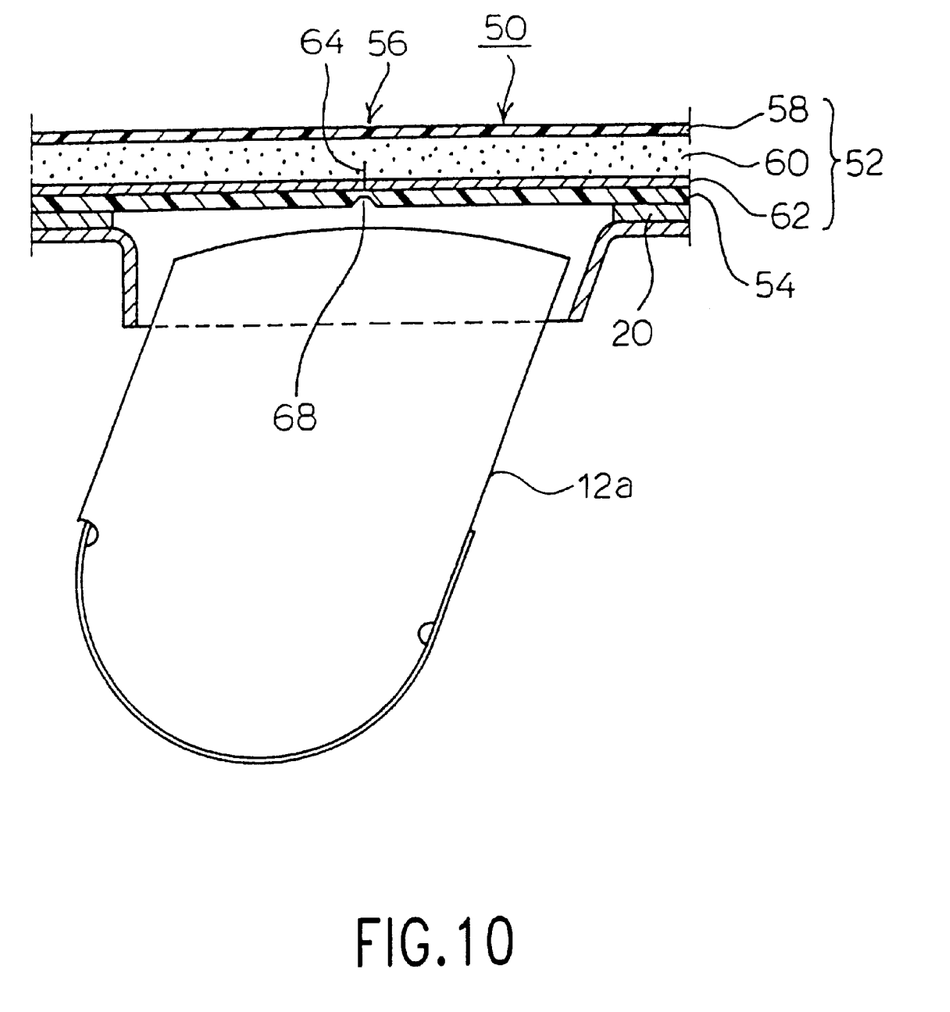
FIG. 10 is a longitudinal section view of an instrument panel for an air bag according to a second embodiment of the present invention.

FIG. 10 is a longitudinal section view of the main part of an instrument panel for an air bag according to a second embodiment of the present invention. Similar to the first embodiment, the instrument panel 50 contains the air bag system 12 for the passenger seat and covers the upper opening of the air bag case 12a.

The instrument panel 50 of the second embodiment is structured by forming a skin member 52, having a double-layer structure, as one body with a door member 54 by inject-molding thermoplastic resin forming the door member 54 on the back of the skin member 52. The instrument panel 50 has a cleaving section 56 having a double Y-letter shape or an H-letter shape when seen in plan view at the parts corresponding to the air bag deployment section of the first embodiment. The edge portion of the door member 54 is fixed to the core member 20.

Figure 11:
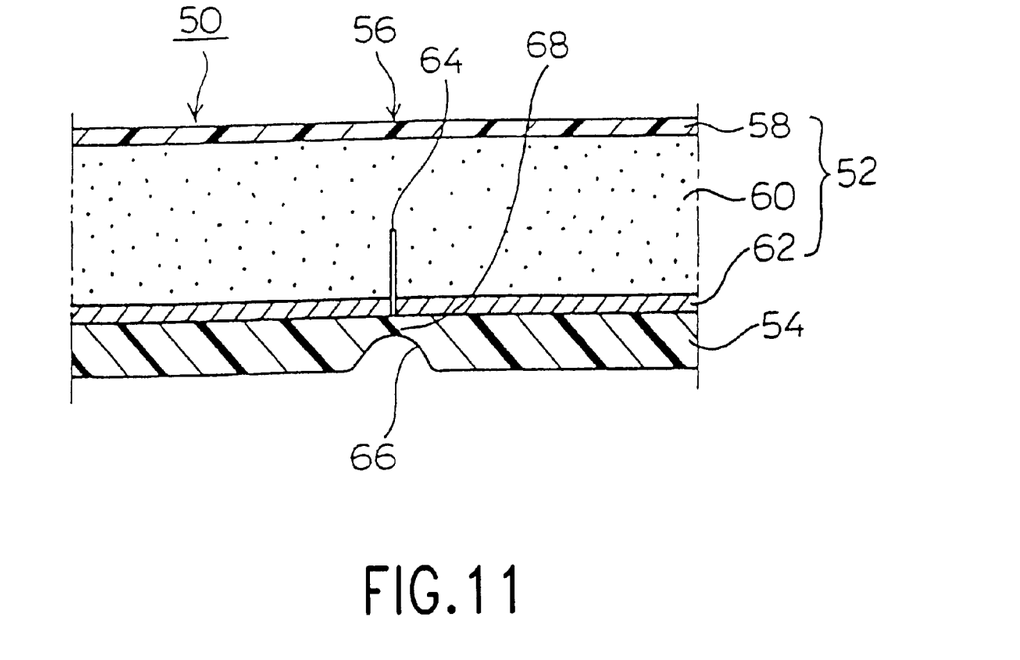
FIG. 11 is an enlarged longitudinal section view showing a main part in FIG. 10.

The skin member 52 comprises three layers, a skin layer 58 molded using polyolefine resin such as PP (polypropylene) or PVC, a cushion layer 60 formed by polyolefine foam such as PP foam on the back of the skin layer 58 and a barrier layer 62 made of soft resin, which three layers are attached to each other to form a body as shown in FIG. 11. A brittle section 64, formed as a linear or slit cut line having a depth not reaching the skin layer 58 but existing at the barrier layer 62 and reaching the lower half of the cushion layer 60, is created on the back of the skin member 52 at the part corresponding to the air bag deployment section.

The linear or slit cut line, which is the brittle section 64 on the side of the skin member 52, may be created (1) by inserting ultrasonic wave or high frequency laser to the depth reaching to the barrier layer 62 and the lower half of the cushion layer 60 after molding the skin layer 58, the cushion layer 60 and the barrier layer 62 attached to each other in a body, or (2) by molding the skin layer 58 and the cushion layer 60 in a body in advance, and on its back disposing and adhering the barrier layer 62 in which the linear or slit cut line has been created.

The door member 54 is adhered on the back of the skin member 52 as one body with it by setting the skin member 52 on a mold not shown and by injection-molding relatively hard thermoplastic material such as denaturation PP. thin brittle section 68 is created by providing a grooved portion 66 dented toward the skin member 52, at the part corresponding to the air bag deployment section, i.e., at the part facing to the brittle section 64 of the skin member 52.

Because the instrument panel 50 is structured by creating the brittle sections 64 and 68 in the skin member 52 and the door member 54 respectively, and the cleaving section 56 is provided by both brittle sections 64 and 68 by forming both members 52 and 54 in one body, it becomes totally unnecessary to implement the post-processing creating the cleaving section by cutting it by ultrasonic or high-frequency after molding both members 52 and 54 in a body which would be cumbersome and require highly a advanced technique in controlling the thickness. Further, the injection-molding means may be readily adopted in molding the door member 54, so that the production cost of the whole instrument panel 50 may be reduced. Further, because the brittle section 68 of the door member 54 is thin and the whole door member 54 is one continuous member having no disconnection, the rigidity around the cleaving section 56 may be enhanced. Therefore, even if force is applied to the instrument panel 50 by touching by a hand, for example, during normal use, stress is not concentrated on the brittle section 64 of the skin member 52, and the skin layer 58 will not dent or wrinkle locally and the quality of appearance does not drop. Nevertheless, when the air bag is actuated and inflated, stress is concentrated on the thin brittle section 68 of the door member 54, thus rupturing it. Stress is then concentrated on the brittle section 64 of the skin member 52 by the ruptured door member 54, and the skin member 52 is cleaved along the cleaving section 56 while being adhered and fixed to the door member 54 and the air bag may be deployed in a prescribed manner.

It is noted that because the brittle section 64 of the skin member 52 is created by the linear or slit cut line at a depth not reaching the skin layer 58 in the case of the second embodiment, the rigidity and the quality of appearance of the instrument panel 50 may be well maintained during normal use i.e., during the time when the air bag is not inflated.

Figure 12:
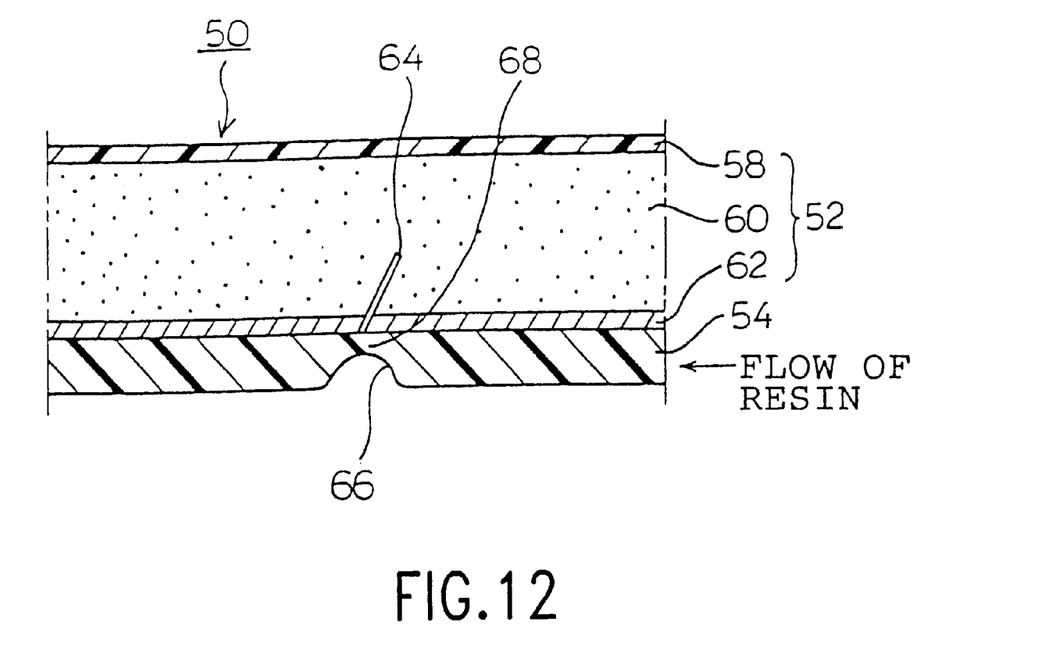
FIG. 12 is an enlarged longitudinal section view of a main part showing another example of a cut line of a skin member of the second embodiment.

Considering in particular that the door member 54 is a member molded by injection-molding, it is possible to prevent resin from infiltrating into the brittle section 64 created in the skin member 52 by setting the direction of inclination of the cut line in the direction such that the resin to be injected will not flow into the cut line as shown in FIG. 12.

Figure 13:
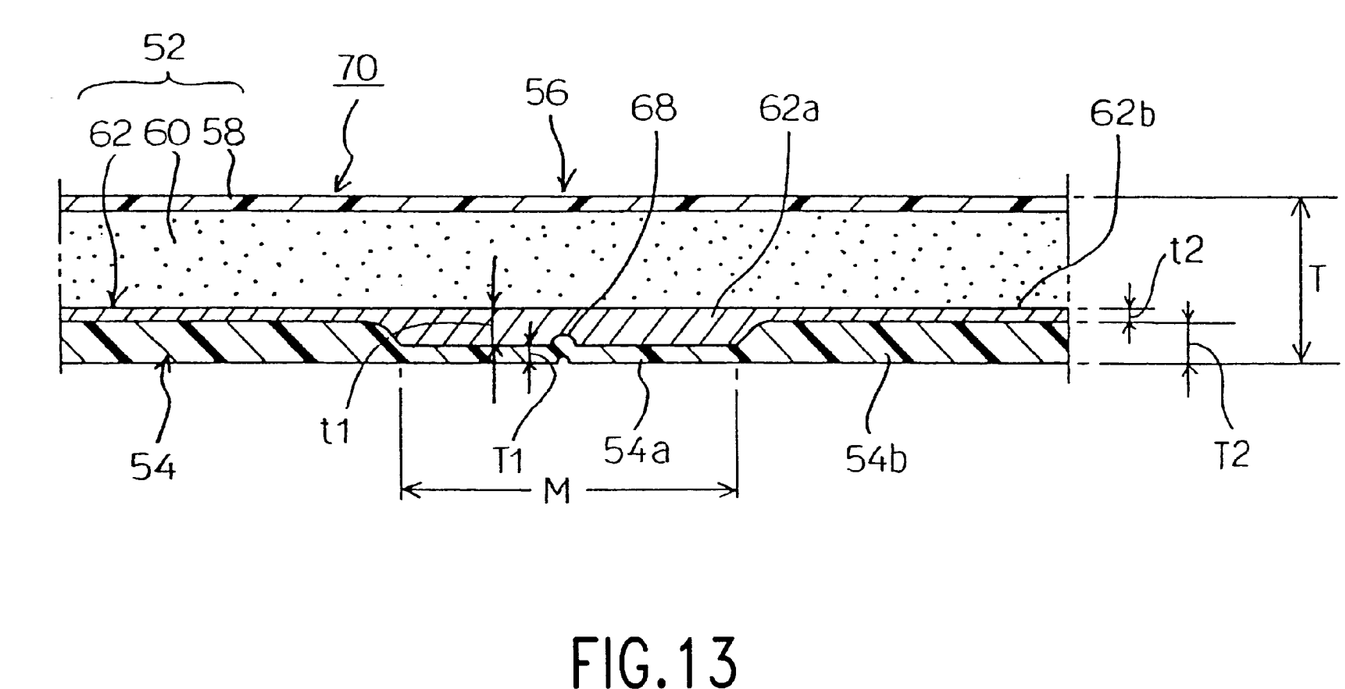
FIG. 13 is a longitudinal section view of a main part of an instrument panel for an air bag according to a third embodiment of the present invention.

FIG. 13 is a longitudinal section view of a main part of an instrument panel for an air bag according to a third embodiment of the present invention. According to the present embodiment, the skin member 52 and the door member 54, in which the brittle section 68 is created by thinning the door member 54, are molded as one body by injection-molding the resin material of the door member to a uniform the thickness T over the whole range of the instrument panel and to render the thickness T1 of a portion 54a of the door member 54 adjacent to the brittle section 68 to be set thinner than the thickness T2 of the other portion 54b, i.e., T2=2T1 to 3T1, in the arrangement of the second embodiment. In other words, the thickness t1 of a portion 62a of the barrier layer 62 of the skin member 52 corresponding to the portion 54a of the door member 54 adjacent to the brittle section 68 is set to be thicker than the thickness t2 of the other portion 62b of the barrier layer 62 by about 2 to 3 times.

It is noted that an area M in the horizontal direction of the portion 54a adjacent to the brittle section 68 where the thickness T1 is thinner than the thickness T2 of the other portion 54b corresponds to an area which connects portions around both hinge points of the door member 54 when it cleaves along the inflation of the air bag.

Although no brittle section 64 of the skin member 52 is shown in the third embodiment, such a brittle section 64 may be created. The other features are the same as those in the second embodiment, the same reference numerals refer to the corresponding parts and their explanation is be omitted here.

Similar to the second embodiment, in the third embodiment it is totally unnecessary to implement the cumbersome post-processing of creating the cleaving section by cutting it by ultrasonic or high-frequency after the production, which would require a highly advanced technique in controlling the thickness. Further, the injection-molding means may be readily adopted in molding the door member 54, so that the production cost of the whole instrument panel 70 may be reduced. Further, it is possible to enhance the rigidity of the cleaving section 56 and to prevent the quality of appearance from dropping by forming the whole door member 54 as one continuous member. Still more, it is possible to enhance the air bag deployment performance by concentrating stress on the brittle section 68 of the door member 54 to cleave the panel at the brittle section 68 by differentiating the thickness of the portion 54a of the door member 54 adjacent to the brittle section 68 from that of the other portion 54b and the thickness of the barrier layer portion 62a of the skin member 52 corresponding to the portion 54a of the door member 54 adjacent to the brittle section 68 from that of the other barrier layer portion 62b.

It is noted that although the skin member 52 has the three-layer structure in the second and third embodiments described above, it may have a two-layer structure without having the barrier layer 62. However, the depth of the brittle section 64 must be within the range of the thickness of the cushion layer 60.

As described above, according to the inventions described, the V-shaped vertical cleaving sections, opening forward and extending obliquely with respect to the direction of extension of the substantially linear longitudinal cleaving section, are ramified respectively from both ends in the longitudinal direction of the longitudinal cleaving section created by a groove provided on the back of a skin member, so that cleavage of the longitudinal cleaving section, which has proceeded along with the inflation of the air bag, is ramified smoothly from the ends in the longitudinal direction to the lateral cleaving sections. Accordingly, the cleaving performance when deploying the air bag may be improved considerably without particularly thinning the thickness of the cleaving sections and thereby, it is possible to reconcile the cleaving performance and the quality of appearance.

According to the inventions described, in no post-processing of cutting the brittle section by ultrasonic or high-frequency after molding the skin member in a body with the door member, which would be cumbersome and require a highly advanced technique in controlling the thickness, is necessary, so that the production cost of the whole instrument panel may be reduced, and the whole panel may be formed as one continuous panel without disconnecting the base material a and the rigidity of the part corresponding to the cleaving section may be increased. Thereby, it is possible to suppress stress from concentrating on the brittle section of the skin member by force applied to the instrument panel during normal use, and prevent the skin layer from being dented or wrinkled locally and the quality of appearance from dropping. Nevertheless, it is possible to concentrate stress on the brittle section of the door member and the brittle section of the skin member facing thereto and to fully effect the predetermined cleaving performance and the air bag deployment performance when the air bag inflates.

According to the invention, in addition to that no post-processing of cutting the cleaving section by ultrasonic or high-frequency after the molding which would be cumbersome and require highly a advanced technique in controlling the thickness is necessary, the production cost of the whole instrument panel may be reduced, the rigidity of the part which turns out to be the cleaving section when the air bag is deployed is increased and the quality of appearance is prevented from dropping, the cleaving performance and the air bag deployment performance is enhanced by causing stress to concentrate on the brittle section of the door member when the air bag inflates by differentiating the thickness of a portion of the door member adjacent to the brittle section from that of the other portion.

What is claimed is:

1. An instrument panel for use with an air bag which cleaves to permit deployment of the air bag, the instrument panel comprising:
   a skin member having an front surface and a back surface opposite said front surface, and
   said skin member having a cleaving section defined on said back surface which cleaves apart as the air bag inflates and applies pressure to said back surface, said cleaving section including:
      a longitudinal cleaving section which is a substantially linear groove, defined by said back surface, having inclined groove side surfaces opposing one another, a substantially flat planar groove bottom surface extending between said groove side surfaces, and first and second ends; and
      first and second V-shaped lateral cleaving sections which are branching grooves, defined by said back surface, each having inclined branch groove side surfaces opposing one another, a substantially flat planar branch groove bottom surface extending between said groove side surfaces, contiguous with and ramified respectively from said first and second ends extending obliquely with respect to virtual longitudinal extensions of said longitudinal cleaving section extending in a longitudinal direction of said longitudinal cleaving section.

2. The instrument panel for an air bag according to claim 1, wherein said cleaving section includes said substantially flat planar groove bottom surface and said substantially flat planar branch groove bottom surfaces forming a ramified bottom portion centered about each of said first and second ends and whereat said substantially flat planar groove bottom surface and said substantially flat planar branch groove bottom surfaces are wider than at adjacent portions thereof to form a substantially triangular shape with sides inversely tapered toward a center of said ramified bottom portion.

3. The instrument panel for an air bag according to claim 1 or 2, wherein said cleaving section includes an initial cleaving section substantially at a longitudinal center thereof whereat said substantially flat planar groove bottom surface is wider than at adjacent portions of said substantially flat planar groove bottom surface outside of said initial cleaving section.

4. The instrument panel for an air bag according to any one of claims 1 or 2, further comprising:
   a door member;
   a cushion layer formed between said door member and said skin member to form one body by injecting and foaming a foam material between said skin member and said door member which is disposed so as to face toward said skin member and open as the air bag inflates; and
   said door member having a projection projecting toward the cleaving section of said skin member so as to effect cleaving of said cleaving section as said air bag inflates and pushes said door open.

5. An instrument panel for use with an air bag which cleaves to permit deployment of the air bag, the instrument panel comprising:
   a skin member having an front surface and a back surface opposite said front surface;
   said skin member having a cleaving section defined on said back surface which cleaves apart as the air bag inflates and applies pressure to said back surface, said cleaving section including:
      a longitudinal cleaving section which is a substantially linear groove, defined by said back surface, having first and second ends; and
      first and second V-shaped lateral cleaving sections which are branching grooves, defined by said back surface, each contiguous with and ramified respectively from said first and second ends extending obliquely with respect to virtual longitudinal extensions of said longitudinal cleaving section extending in a longitudinal direction of said longitudinal cleaving section;
   a door member;
   a cushion layer formed between said door member and said skin member to form one body by injecting and foaming a foam material between said skin member and said door member which is disposed so as to face toward said skin member and open as the air bag inflates;
   said door member having a projection projecting toward the cleaving section of said skin member so as to effect cleaving of said cleaving section as said air bag inflates and pushes said door open;
   said substantially linear groove including an initial cleaving section substantially at a longitudinal center thereof whereat said substantially linear groove is wider than at adjacent portions of said substantially linear groove outside of said initial cleaving section; and
   said projection having at least one initial cleaving projection portion projecting toward said initial cleaving section having a height higher than a remainder of said projection to project closer to said cleaving section than said remainder of said projection.

6. The instrument panel for an air bag according to claim 5, wherein:
   said substantially linear groove has inclined groove side surfaces opposing one another, a substantially flat planar groove bottom surface extending between said groove side surfaces; and
   said branching grooves each have inclined branch groove side surfaces opposing one another, a substantially flat planar branch groove bottom surface extending between said groove side surfaces.

7. The instrument panel for an air bag according to claim 6, wherein said cleaving section includes said substantially flat planar groove bottom surface and said substantially flat planar branch groove bottom surfaces forming a ramified bottom portion centered about each of said first and second ends and whereat said substantially flat planar groove bottom surface and said substantially flat planar branch groove bottom surfaces are wider than at adjacent portions thereof to form a substantially triangular shape with sides inversely tapered toward a center of said ramified bottom portion.

8. The instrument panel for an air bag according to claim 7, wherein said projection includes at least a second initial cleaving projection portion projecting toward at least and said ramified bottom portion having a height higher than a reminder of said projection, excluding said at least one initial cleaving projection, to project closer to said cleaving section than said remainder of said projection.

9. An instrument panel for use with an air bag which cleaves to permit deployment of the air bag, the instrument panel comprising:
   a skin member having a front skin member surface and a back skin member surface, said skin member including a skin layer having a front surface, forming said front skin member surface, and a back surface and at least a cushion layer made of foam resin and disposed on the back surface of said skin layer;

said skin member having a frangible skin section formed in at least said cushion layer, but not in said skin layer, at a part corresponding to an air bag deployment section;

a door member, made of synthetic resin, having a frangible door section at a position corresponding to said air bag deployment section which is formed by a portion of said door member which is thinner than adjacent portions of said door member; and said skin member being formed as one body with said door member by injection-molding said synthetic resin on said back skin member surface so that said frangible skin section and said frangible door section face each other.

10. The instrument panel for an air bag according to claim 9, wherein said frangible skin section of said skin member is formed by a cut in said cushion layer having a depth not reaching said skin layer.

11. The instrument panel for an air bag according to claim 10, wherein said cut is disposed obliquely with respect to said back skin member surface.

12. An instrument panel for an air bag, comprising:

a skin member having a front skin member surface and a back skin member surface, said skin member including a skin layer having a front surface, forming said front skin member surface, and a back surface and at least a cushion layer made of foam resin and disposed on the back surface of said skin layer;

a door member made of synthetic resin, having a frangible door section at a position corresponding to said air bag deployment section;

said skin member being formed as one body with said door member by injection-molding said synthetic resin of said door member on the back skin member surface of said skin member so said one body has a uniform thicknes;

said door member having a thin door portion, including said frangible door section, which is thinner than adjacent portions of said door member and said skin member having a thick skin member portion, facing said thin door portion, that is thicker than adjacent portions of said skin member.

13. An instrument panel for use with an air bag which cleaves to permit deployment of the air bag, the instrument panel comprising:

a skin member having an front surface and a back surface opposite said front surface;

said skin member having a cleaving section defined on said back surface which cleaves apart as the air bag inflates and applies pressure to said back surface, said cleaving section including:

a longitudinal cleaving section which is a substantially linear groove, defined by said back surface and having first and second ends; and first and second V-shaped lateral cleaving sections which are branching grooves, defined by said back surface, contiguous with and ramified respectively from said first and second ends extending obliquely with respect to virtual longitudinal extensions of said longitudinal cleaving section extending in a longitudinal direction of said longitudinal cleaving section; and said cleaving section including said substantially linear groove and said branching grooves forming a ramified portion centered about each of said first and second ends and whereat said substantially linear groove and said branching grooves are wider than at adjacent portions thereof to form a substantially triangular shape with sides inversely tapered toward a center of said ramified portion.

14. The instrument panel for an air bag according claim 13 wherein said cleaving section includes an initial cleaving section substantially at a longitudinal center thereof whereat said substantially linear groove is wider than at adjacent portions of said substantially linear groove outside of said initial cleaving section.

15. An instrument panel for use with an air bag which cleaves to permit deployment of the air bag, the instrument panel comprising:

a skin member having an front surface and a back surface opposite said front surface;

said skin member having a cleaving section defined on said back surface which cleaves apart as the air bag inflates and applies pressure to said back surface, said cleaving section including:

a longitudinal cleaving section which is a substantially linear groove, defined by said back surface and having first and second ends; and first and second V-shaped lateral cleaving sections which are branching grooves, defined by said back surface, contiguous with and ramified respectively from said first and second ends extending obliquely with respect to virtual longitudinal extensions of said longitudinal cleaving section extending in a longitudinal direction of said longitudinal cleaving section; and said cleaving section including an initial cleaving section substantially at a longitudinal center thereof whereat said substantially linear groove is wider than at adjacent portions of said substantially linear groove outside of said initial cleaving section.

* * * * *